Oct. 13, 1964 E. J. McLAUGHLIN 3,152,851

WIRING DEVICE AND WIRE RELEASE ARRANGEMENT THEREFOR

Filed April 12, 1963

WITNESSES:
John G. Chopp
Edward F. Poorasky

INVENTOR
Emmett J. McLaughlin
BY F. P. Lyle
ATTORNEY

United States Patent Office 3,152,851
Patented Oct. 13, 1964

3,152,851

WIRING DEVICE AND WIRE RELEASE ARRANGEMENT THEREFOR

Emmett J. McLaughlin, Fairfield, Conn., assignor, by mesne assignments, to Westinghouse Electric Corporation, a corporation of Pennsylvania Filed Apr. 12, 1963, Ser. No. 272,681
2 Claims. (Cl. 339—95)

The present invention relates to wiring devices and more particularly to wire release arrangements for employment in wiring devices having quick wire attachment structure.

One common form in which quick wire attachment structure is provided in wiring devices is that in which one or more terminals or other conductive members are each provided with a resiliently deflectable arm to which wire access is provided from the exterior of the wiring device by means of a wire channel or opening. Upon initial insertion, the wire normally is guided in the wire channel toward the free end of the wire engagement arm. Continued wire insertion results in angular deflection of the wire engagement arm and the wire is then braced against an insulative or conductive member or abutment by resilient reactionary force from the wire engagement arm end. Pulling force on the wire then commonly results in return force on the wire engagement arm and consequent biting action by the arm on the wire so as to produce even greater holding action. However, release of wire can be accomplished by deflecting the wire engagement arm away from the wire through the use of a separate tool such as a screwdriver insertable through another wiring device opening provided specifically for this purpose.

In terms of advantage, the provision of quick wire attachment structure in a wiring device leads to several benefits including lower wiring time than is necessary in the comparative case where screws or the like are used for wire attachment. Similarly, it is also advantageous to employed quick wire release structure as an included part of such devices since, as one significant gain, the need for carrying a suitably sized tool which might not otherwise be carried and the need for engaging in the motion and effort necessary for employing such a tool is avoided.

Thus, in accordance with the broad principles of the invention there is provided a wiring device having an insulative housing in which at least one conductive member is supported. The conductive member is provided with a resiliently deflectable wire engagement arm and a wire insertable through the housing angularly deflects the conductive member arm. The wire in turn is engaged by the conductive member arm against a suitable insulative or conductive abutment. Insulative release means are supported in movable relation to the housing so as to be accessible from the housing exterior for the application of manual or other wire release force. Applied release force produces movement of the release means against the conductive member arm and resulting angular deflection of the arm away from the wire. Pulling force on the wire then completes its release or withdrawal from the wiring device.

Accordingly, it is an object of the invention to provide a novel and efficient wiring device wherein there is provided structure for quick wire attachment and release.

It is another object of the invention to provide a novel and efficient wiring device wherein there is provided quick wire attachment structure and wherein there is provided insulative means in movable relation to a housing of the wiring device for the purpose of cooperating with the quick wire attachment structure in producing quick wire release action.

An additional object of the invention is to provide a novel and efficent wiring device as set forth in the preceding object, wherein the quick wire release action is obtained by pivotal movement of the insulative means.

These and other objects of the invention will become more apparent upon consideration of the following detailed description in conjunction with the attached drawing, in which.

Figure 1:
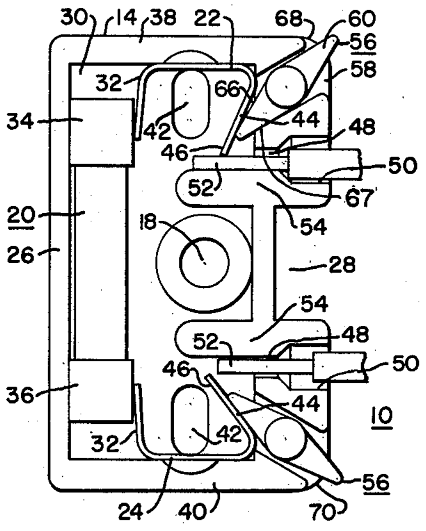
FIGURE 1 is a top plan view of the bottom half of a wiring device, or more specifically a fuse holder, which is constructed in accordance with the principles of the invention.
Figure 2:
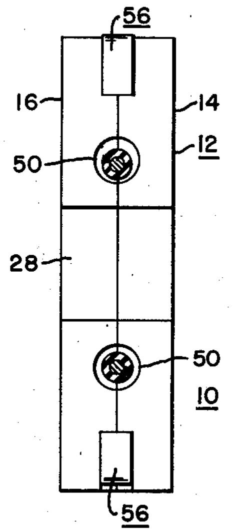
FIG. 2 shows a side view of the complete wiring device or fuse holder of FIG. 1.
Figure 3:
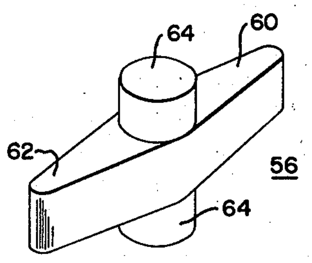
FIG. 3 is a perspective view of an insulative member employed in the wiring device or fuse holder of FIG. 1 for the purpose of obtaining quick wire release action.

More particularly, there is shown in FIGS. 1 and 2 a wiring device 10 provided in the form of a fuse holder and comprising an insulative housing 12 which can be formed from one or more parts such as identical base and cover members 14 and 16. The housing 12, or its members 14 and 16, is generally molded to provide a solid geometry of internal space suitable for supporting the housed components or elements in operative relationships. In this instance, the base and cover members 14 and 16 can be held together by suitable securing means such as a rivet (not shown) extended through opening 18 in each of the members 14 or 16.

Since in this example of the invention the wiring device 10 is provided in the form of a fuse holder, the housing 12 is arranged to support elements providing a series fuse circuit, namely, a fuse 20 is connected in series between respective line terminals 22 and 24. The fuse 20 is supported against side wall 26 of the base and cover members 14 and 16, and in addition top wall 28 of the cover member 16 as well as bottom wall 30 of the base member 14. A resilient end arm 32 of each terminal 22 or 24 is disposed in engagement with respective end conductive caps 34 and 36 which are disposed on the fuse 20.

In other respects, each terminal 22 or 24 is generally held in place against end wall 38 or 40 of the base and cover members 14 and 16 by means of projection 42. An elongated wire engagement arm 44 of each terminal 22 or 24 extends from the adjacent end wall 38 so that an end portion 46 thereof is disposed in alignment with wire insertion channel 48. Each wire channel 48 extends to the exterior of the housing 12 through a housing opening 50 (FIG. 2).

When a wire 52 is inserted into the wire channel 48, the leading end thereof engages the arm end portion 46 and deflects the wire engagement arm 44 toward the projection 42. Once the leading end of the wire 52 has progressed in its movement beyond the arm end portion 46, resilient reactionary force from the wire engagement arm 44 holds the wire against housing abutment 54. Pulling force on the wire 52 then normally is effective only to produce greater biting action by the arm end portion 46 against the wire 52 since such pulling force tends to deflect the wire engagement arm 44 away from the projection 42 and toward the wire 52. Within limits, greater wire holding action is thus produced.

Quick wire attachment structure of the general type just described can be used in a great variety of wiring devices such as single or duplex receptacles, switches, lampholders, combination switches and receptacles and numerous others. Although some variation in quick wire attachment structure from the quick wire attachment structure described herein is often to be found in wiring devices, the essential principles of operation are usually alike.

For example, modified wire attachment members or terminals are very often embodied with additional structural features needed in the particular wiring device in which the members or terminals are used, but the employment of a wire engagement arm similar to the arm 44 justifies classification of such modified members or terminals with the terminal 22 or 24 insofar as the basic nature of the described wire engagement action is used as the classification basis. As another example, modified wire engagement members can be limited in function to wire engagement without current carrying action or, alternately, can provide wire engagement and carry only a portion of the wire current. In either of these events a conductive terminal plate is normally employed as abutment means against which an inserted wire is held by gripping action of the wire engagement arm and material selection for the wire engagement arm can thus be made more on a basis of resiliency properties than on a basis of balancing between resiliency properties and current carrying properties.

Thus, the wire release structure now to be described can be cooperatively employed in numerous types and styles of wiring devices. Such structure includes movable insulative wire release means or member 56 supported for movement relative to the housing 12 in or in alignment with housing channel 58 so that actuating portion 60 of the wire release member 56 is accessible from the exterior. Insulative material is preferred for the wire release member 56 in the interest of safety against the hazard of electrical shock.

In operation, the insulative member 56 is movable to a "release position" in response to actuating force applied to the actuating portion 60 so that driving portion 62 produces deflection of the wire engagement arm 44 away from the wire 52. The wire 52 can then be withdrawn from the wiring device or fuse holder 10 as observed in the bottom half of FIGURE 1. The resilient return force of the wire engagement arm 44 on the insulative drive portion 62 returns the insulative member 56 to its original position. However, other or additional spring means can be arranged in a wiring device to produce return force on the insulative release means if desired.

Although sliding movement can be used as the medium for release force transmittal to the wire engagement arm, pivotal movement is used in this case and for this reason the insulative member 56 is provided with pivot portions 64 respectively supported in adjacent cover and base recesses (not shown). Further, since the pivot portions 64 are disposed within the channel 58 which is generally elongated with a rectangular cross section, the insulative member 56 is characterized generally with a solid parallelogram structure so that it is possible for the insulative member 56 to pivot in the rectangularly cross sectioned channel 58 while the extent of the insulative member pivotal movement can be limited by the insulative member 56 itself as determined by the size of the major angle included in the longitudinal parallelogram section of the member 56. Thus, drive portion side 67 (FIG. 1) is engageable with the adjacent channel side surface to limit pivotal movement of the insulative member 56 in one direction and thus, in turn, the extent to which the arm 44 can be outwardly deflected when the wire 52 is pulled.

In the opposite or wire release direction of pivotal movement, the insulative member 56 can be limited in its movement by abutment of the actuating portion 60 or by the extent to which the wire engagement arm 44 can be angularly deflected (such as by the housing projection 42) in the wire release direction.

It is further noted that with the solid parallelogram structure, side 66 (FIG. 1) of the insulative member drive portion 62 can be parallel or nearly parallel to the extending direction of the wire engagement arm 44 when it is in engagement with the wire 52. Therefore, substantial driving surface engagement can be provided between the wire engagement arm 44 and the drive portion side 66 during or shortly after initial application of release force to the actuating portion 60 and the risk of fracturing the member 56 is thus correspondingly diminished. It is also noteworthy that the channel 58 can extend angularly away from the wire insertion channel 48 so as to enable the insulative member 56 to be positioned for the drive surface engagement just described. Such angular extension of the channel 58 also enables the actuating portion 60 to be extended outwardly through device corner 68 or 70 where manual gripping thereof is facilitated.

The foregoing description has been presented only to point out the principles of the invention. Accordingly, it is desired that the invention be not limited by the embodiment or embodiments described, but, rather, that it be accorded an interpretation consistent with the scope and spirit of its broad principles.

What is claimed is:

1. In a wiring device having an insulative housing with at least one elongated wire insertion channel, the combination comprising a resilient member having an elongated resilient wire engagement arm, a free outer end of said arm extending at least partly across said wire insertion channel so that insertion of a wire along said channel produces angular resilient deflection of said arm which in turn braces said wire against adjacent abutment means, and a wire release insulative member supported in movable relation to said housing, said insulative member having at least one pivot portion pivotally supported adjacent a bottom surface of another elongated channel in said housing, said other channel extending in generally parallel relation with said arm and having generally parallel side surfaces, a drive portion of said insulative member extending inwardly along said other channel from one side of said insulative member pivot portion, an actuating portion of said insulative member extending outwardly along said other channel from the opposite side of said insulative member pivot portion, said insulative member having a longitudinal section of general parallelogram contour through said drive and actuating portions, one parallelogram side of said drive portion being engageable with and extending generally parallel with an inwardly located portion of said wire engagement arm so as to provide for urging said arm resiliently and angularly outwardly from engagement with said wire, another parallelogram side of one of said insulative member drive and actuating portions being engageable with one of opposite side surfaces of said other channel to limit the extent to which said insulative member can be deflected away from said wire engagement arm and thus the extent to which said arm can be deflected by pulling forces on said wire, said other channel opening to the exterior of said housing so that access is provided to said insulative member actuating portion for the application of wire release forces thereto.

2. In a wiring device having an insulative housing with at least one elongated wire insertion channel, the combination as set forth in claim 1 wherein said wire insertion channel is generally perpendicular to one side of said housing and said insulative member channel is spaced from said wire insertion channel and extends angularly away from said wire insertion channel to one edge of said housing side, said insulative member actuating portion having a free end thereof extending outwardly of said edge where the application of manual wire release force thereto is facilitated.

References Cited in the file of this patent

UNITED STATES PATENTS

| | | |
|---|---|---|
| 2,708,225 | Fitzgerald | May 10, 1955 |
| 2,713,668 | Gibilisco | July 19, 1955 |
| 2,780,791 | Morschel | Feb. 5, 1957 |
| 2,816,193 | Pine | Dec. 10, 1957 |
| 3,099,505 | Schwartz | July 30, 1963 |

FOREIGN PATENTS

| | | |
|---|---|---|
| 539,050 | Belgium | July 15, 1955 |
| 466,821 | Great Britain | June 7, 1937 |
| 562,631 | Great Britain | July 10, 1944 |
| 726,317 | Great Britain | Mar. 16, 1961 |
| 658,035 | France | Jan. 22, 1929 |